United States Patent Office 2,767,293
Patented Oct. 16, 1956

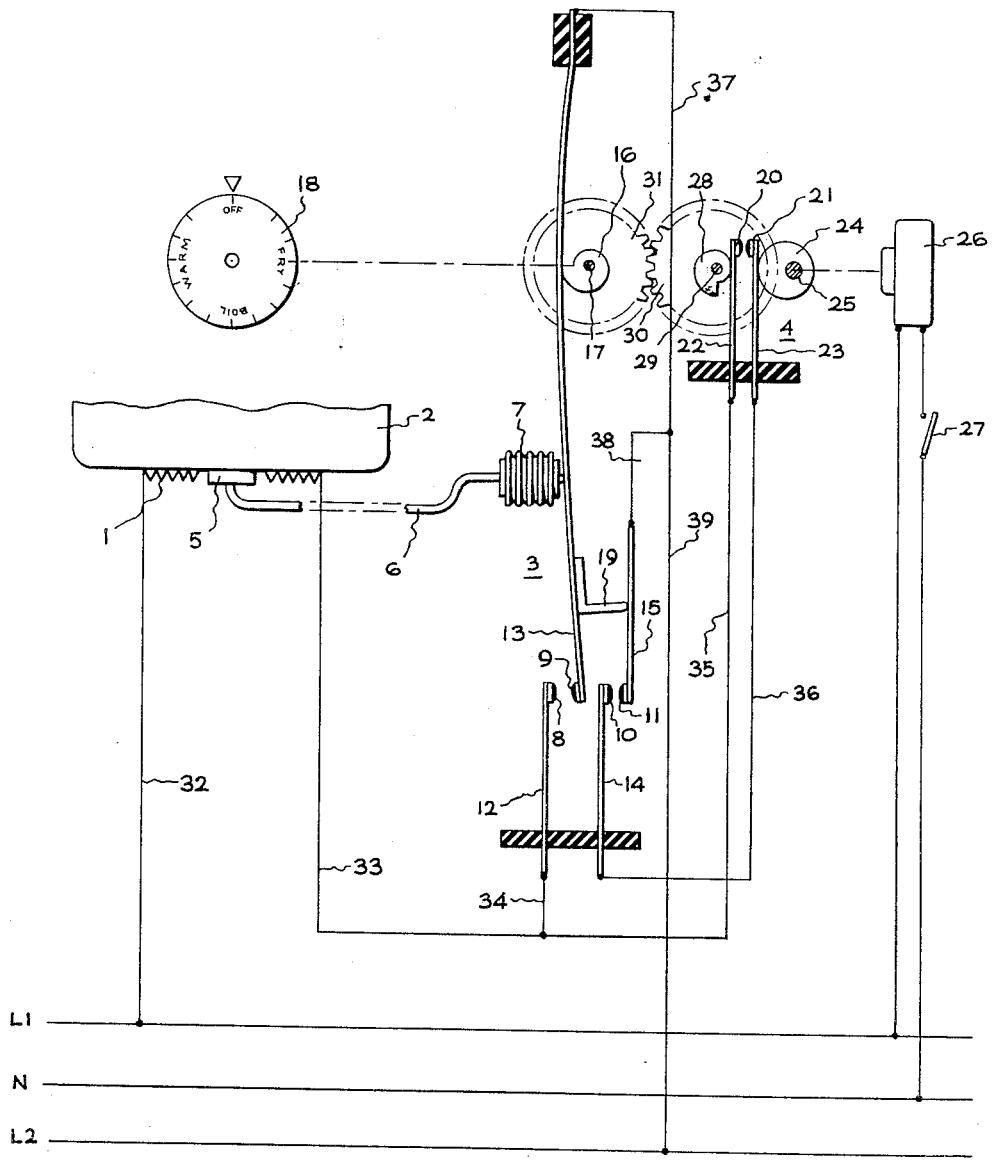

2,767,293

TEMPERATURE CONTROL SYSTEM

Samuel C. Jordan, Lyndon, and Louis H. Fitzmayer, Louisville, Ky., assignors to General Electric Company, a corporation of New York Application May 20, 1955, Serial No. 509,869

1 Claim. (Cl. 219—20)

This invention relates to temperature control systems and more particularly to systems of this nature particularly adapted to control the energization of a surface heating unit or hot plate.

A principal object of the present invention is to provide an automatic heat control system or surface heating unit in which the energization of the heating element is controlled in accordance with utensil temperature so that the desired temperature may be rapidly reached and accurately maintained.

Another object of this invention is to provide an automatic surface heating unit including a control system arranged to maintain the heat output of the unit at a high value until the temperature of the utensil approaches the desired temperature and then to reduce the heat output to a lower average value sufficient to maintain the desired temperature.

Further objects and advantages of the invention will become apparent as the following description proceeds, and the features of novelty which characterize the invention will be pointed out with particularity in the claim annexed to and forming a part of this specification.

Briefly stated, in accordance with one aspect of our invention we provide a heating unit energized through a thermostatic control system including two pairs of thermostatic contacts actuated in accordance with the temperature of the utensil heated by the heating unit, and a wattage regulating device connected in series with one of the pairs of thermostatic contacts. The thermostatic mechanism is so arranged that the heating unit is directly connected to an electrical energy source through one set of contacts until the desired temperature is approached at which time those contacts open and the heating unit is then energized by means of a circuit including the other pair of thermostatic contacts and the wattage regulating device. Thereafter, the supply of current to the heating unit is controlled by the latter pair of contacts in accordance with utensil temperature and also regulated by the wattage regulating device.

For a better understanding of our invention reference may be made to the accompanying drawing in which the single figure is a diagrammatic view of an automatic surface heating unit system constructed in accordance with our invention.

Referring to the drawing, the numeral 1 designates a resistance heating unit arranged to support a cooking utensil 2. Heating unit 1 is energized from a source of electric energy represented by supply lines L1, L2 and a neutral line N, and its energization is automatically controlled in accordance with the temperature of the utensil 2 by means including thermostatic mechanism 3 and wattage regulating mechanism 4. Thermostatic mechanism 3 includes a fluid filled chamber or bulb 5 adapted to rest in heat transfer relation with utensil 2, and for this purpose it may be centrally located within heating unit 1 as is now well known in the art. Connected to temperature-sensing bulb 5 by means of a tube 6 is a fluid filled expansible chamber or bellows 7 arranged to actuate a first pair of thermostatic contacts 8 and 9, and a second pair of thermostatic contacts 10 and 11. Contacts 8, 9, 10, and 11 are mounted on flexible contact carrying arms 12, 13, 14, and 15 respectively, and as will now be described are so arranged that contacts 10, 11 open at a temperature somewhat higher than the temperature at which contacts 8, 9 open.

Contacts 9 and 11 are positioned in accordance with the temperature of utensil 2 by movement of bellows 7 since flexible arm 13 is biased into engagement with the bellows. Thermostatic mechanism 3 is, of course, manually adjustable to provide various temperature settings and includes a manually operable cam 16 engageable with arm 13 for varying the relation between the position of contact 9 and the temperature of utensil 2. Thus, if shaft 17 on which cam 16 is mounted is rotated clockwise by means of control handle 18 from the "off" position shown in the drawing, contact 9 will be shifted progressively toward contact 8 so that progressively higher utensil temperatures, as sensed by bulb 5, are required to open contacts 8, 9.

Flexible arm 15 is biased toward arm 14 so that contacts 10, 11 are normally engaged, and is moved away from arm 14 so as to open contacts 10, 11 by movement of arm 13 away from arm 12. A projecting finger 19 is secured to arm 13 and arranged to engage arm 15 whenever arm 13 is moved a predetermined distance away from the position in which contacts 8, 9 are in engagement. The spacing and arrangement of these contacts is preferably such that there is a temperature differential of approximately 50°, for example, between the first pair of contacts 8, 9 and the second pair 10, 11. In other words, at the beginning of a cooking operation when knob 18 has been set to the desired temperature and utensil 2 is cold, both pairs of contacts are closed and remain so until the temperature of utensil 2 rises to within 50° of the pre-set temperature, at which time contacts 8, 9 open and remain open so long as the temperature of the utensil exceeds this value. Thereafter, contacts 10, 11 remain closed until the vessel reaches the pre-set temperature and then cycle in accordance with utensil temperature so as to maintain the desired cooking temperature.

Contacts 10 and 11 of thermostatic mechanism 3 are connected in series with the wattage regulating device 4, which comprises a pair of periodically cycling contacts 20 and 21 mounted on contact carrying arms 22 and 23, respectively. Contact 21 is periodically moved toward and away from contact 20 by a cam 24 mounted on a shaft 25 and rotated at constant speed by a suitable electric motor 26. Preferably, motor 26 is energized only when control knob 18 is moved from its off position to a heating position, and accordingly a switch 27 in the motor energizing circuit and operated by knob 18 may be provided. Preferably wattage regulator 4 includes manually adjustable means for varying the position of contact 20 (and therefore the average wattage input to the heating unit as hereinafter explained) and accordingly a cam 28 in engagement with contact arm 22 is provided to position contact 20. It is also desirable that the regulating function of wattage regulator 4 be coordinated with the temperature setting function of thermostatic mechanism 3, and this may be accomplished by mounting cam 28 on a shaft 29 which carries a gear 30 meshing with a gear 31 secured to shaft 17. Thus it will be seen that rotation of control handle 18 clockwise toward progressively higher temperature settings not only adjusts thermostatic mechanism 3 but also causes contact 20 to shift toward contact 21 so as to increase the time intervals during which contacts 20, 21 are in closed position.

Referring now to the circuit connection between heating unit 1, thermostatic mechanism 3, and wattage regulator 4, one terminal of heating unit 1 is connected directly to supply line $L_1$ while the other terminal is connected through the thermostat and the wattage regulator to line $L_2$. Obviously, however, a double pole thermostatic mechanism could be utilized so as to interrupt both line connections to the heating unit, as will be understood by those skilled in the art. In the system illustrated in the drawing, a lead 32 connects one terminal of heating unit 1 to supply line $L_1$ while its other terminal is connected by leads 33 and 34 to contact 8 and also to contact 20 of wattage regulator 4 by lead 35. A lead 36 connects the other contact 21 of regulator 4 to contact 10 of thermostat 3, while contacts 9 and 11 of the thermostat are connected to supply line $L_2$ by leads 37, 38, and 39. Thus, heating unit 1 may be energized either through contacts 8, 9 or through a separate parallel circuit including contacts 10, 11 and contacts 20, 21.

In describing the operation of the invention, it will be assumed that a utensil at room temperature has been placed on surface heating unit 1 and that control handle 18 is rotated clockwise to the desired temperature setting. As handle 18 is rotated, contacts 8, 9 and 10, 11 immediately close thus energizing the heating unit through a circuit which may be traced from line $L_1$ through lead 32, heating unit 1, lead 33, lead 34, contacts 8, 9, lead 37 and finally lead 38 to supply line $L_2$. Simultaneously, motor 26 is energized by the closure of switch 27 thus causing cam 24 to cycle contacts 20 and 21 into and out of engagement; however, because contacts 8, 9 are closed the wattage regulator 4 has no effect on the energization of the heating unit. As the utensil is heated, its temperature increases thus causing bellows 7 to expand and when its temperature reaches a value approximately 50° below the desired temperature (as set by handle 18) contact arm 15 has been moved far enough to the right by movement of arm 16 to disengage contacts 8, 9 thus interrupting the circuit through these contacts. However, contacts 10, 11 remain closed until the utensil reaches the desired temperature and thus heating unit 1 is energized through a circuit which may be traced from line $L_1$ through lead 32, heating unit 1, lead 33, lead 35, wattage regulating contacts 20, 21, lead 36, thermostatic contacts 10, 11, lead 38, and finally lead 39 to supply line $L_2$. Consequently, the heating unit is energized at a reduced wattage determined by the setting of wattage regulator 4. From this point on during the cooking operation contacts 10 and 11 cycle from open to closed position in accordance with the temperature of the utensil while contacts 20, 21 of the wattage regulator cycle at a constant rate. Thus current is supplied to the heating unit during those intervals when both contacts 10, 11 and 20, 21 are closed, it being noted that the average wattage supplied during the cooking operation will depend upon the setting of the wattage regulator and the temperature setting of thermostat 3.

By providing a single control handle in driving relationship with the temperature setting mechanism of thermostat 3 and the adjusting mechanism of wattage regulator 4 so that the average wattage input is increased in direct proportion to the temperature setting, an extremely sensitive and accurate temperature control system is achieved.

What we claim is:

A temperature responsive control system for an electric surface heating unit comprising a first pair of thermostat contacts adapted to connect said heating unit to a source of electric energy, a second pair of thermostat contacts also adapted to connect said heating unit to said source, thermostatic means for operating said pairs of contacts in accordance with the temperature of a utensil supported on said heating unit, said second pair of contacts being constructed and arranged to open at a temperature higher than the temperature at which said first pair of contacts open and to close at a temperature higher than the temperature at which said first pair of contacts close, said thermostatic means including a fluid-filled expansible chamber for actuating said thermostat contacts, a second fluid-filled chamber adapted to rest in heat transfer relation with said utensil and hydraulically connected to said expansible chamber, first manually operable means for varying the relation between the positions of said thermostat contacts and the temperature of said utensil, a pair of cycling contacts connected in series with said second pair of thermostat contacts, means for reciprocating one of said cycling contacts, second manually operable means for positioning the other of said cycling contacts so as to selectively vary the intervals during which said cycling contacts are in engagement, and a control handle connected in driving relationship to said first and second manually operable means so that movement thereof toward the highest temperature setting of said thermostatic means also increases the intervals during which said cycling contacts remain in engagement.

References Cited in the file of this patent

UNITED STATES PATENTS

| 2,386,009 | Smith | Oct. 2, 1945 |
| 2,445,021 | Clark | July 13, 1948 |
| 2,524,506 | Akeley | Oct. 3 1950 |